United States Patent [19]
Koizumi

[11] 3,962,724
[45] June 8, 1976

[54] METHOD OF AND DEVICE FOR TESTING MOVABLE MAGNETIC HEADS FOR ABILITY TO TRACE A PREDETERMINED SPIRAL MAGNETIC TRACK WITHOUT DEVIATING THEREFROM

[75] Inventor: Masami Koizumi, Yokohama, Japan

[73] Assignee: Ricoh Co., Ltd., Tokyo, Japan

[22] Filed: May 11, 1973

[21] Appl. No.: 359,364

[30] Foreign Application Priority Data
May 16, 1972 Japan............................... 47-48842

[52] U.S. Cl................................... 360/31; 360/77; 360/86
[51] Int. Cl.² .................... G11B 27/36; G11B 21/10
[58] Field of Search ........................... 274/4 H, 4 J; 340/174.1 B, 174.1 C; 179/100.2 S, 100.2 B; 360/31, 75, 77, 86

[56] References Cited
UNITED STATES PATENTS

| | | | |
|---|---|---|---|
| 3,530,258 | 9/1970 | Gregg et al. | 179/100.3 V |
| 3,740,736 | 6/1973 | Dion et al. | 360/86 |
| 3,742,470 | 6/1973 | Ha et al. | 340/174.1 B |

*Primary Examiner*—Ames W. Moffiti
*Attorney, Agent, or Firm*—Cooper, Dunham, Clark, Griffin & Moran

[57] ABSTRACT

A method of and a device using a testing sheet having magnetically recorded thereon a magnetic head deviation detection signal formed on a portion of a predetermined spiral magnetic track or on a portion of a predetermined spiral magnetic track and on at least one side of such one portion. By causing a magnetic head mounted on a turntable of magnetic recording and reproducing apparatus for magnetically recording and reproducing electric signals in a spiral track to move along the predetermined spiral track on the testing sheet which is fixed, it is possible to find out if the magnetic head is able to trace the predetermined spiral magnetic track without deviating therefrom.

5 Claims, 17 Drawing Figures

METHOD OF AND DEVICE FOR TESTING MOVABLE MAGNETIC HEADS FOR ABILITY TO TRACE A PREDETERMINED SPIRAL MAGNETIC TRACK WITHOUT DEVIATING THEREFROM

BACKGROUND OF THE INVENTION

This invention relates to a method of and a device for testing movable magnetic heads of magnetic recording and and reproducing apparatus for recording and reproducing electric signals in a spiral track to find out if the magnetic heads are able to trace a predetermined spiral magnetic track without deviating therefrom.

In one type of magnetic recording and reproducing apparatus for recording and reproducing electric signals in a spiral track, the magnetic head mounted on the turntable moves in revolving motion on the magnetic surface of a fixed magnetic sheet while tracing a spiral track so as to record or reproduce signals. That is to say, the head is arranged to undergo simultaneous rotary motion and radial motion relative to the turntable axis, thereby tracing a continuous spiral path on the fixed magnetic sheet surface. The head may either record signals on this spiral track, or may reproduce signals previously recorded along the same spiral track on the sheet.

Stated with reference to the reproduction of signals previously recorded (e.g. by another head), maintained accurate register of the head with the recorded spiral track is essential for proper signal reproduction. Deviation of the spiral path of the head from the recorded spiral track on the sheet, whether resulting from misalignment of the center of the spiral or from other causes prevents faithful playback of the recorded signals. Therefore, detection and correction of any such deviation are important to assure satisfactory operation of magnetic recording and reproducing devices of the spiral track type.

Heretofore, detection of head deviation has been performed visually, by positioning on the device (in place of a magnetic recording sheet) a transparent sheet bearing a visible spiral track, and watching the traverse of this track by the head. Deviation or misregister of the head is thus determined by ocular observation of departure of the head from the visible track. Such visual inspection requires very close scrutiny for relatively extended periods of time, and is tiring as well as being subject to human error.

SUMMARY OF THE INVENTION

This invention has as its object the provision of a method of and a device for testing movable magnetic heads of magnetic recording and reproducing apparatus for recording and reproducing electric signals in a spiral track to find out if the magnetic heads are able to trace a predetermined spiral track by using a testing sheet for electrically detecting the deviation of the magnetic head from the predetermined spiral magnetic track either through the sense of hearing of the operator or by means of a meter.

The method of and the device for testing the movable magnetic heads according to the invention allows a ready determination of whether the path of movement of the magnetic heads follows the regular spiral magnetic track through the auditory sense of the operator or by means of a meter. The method is high in efficiency and the results achieved by it are free from individual variation. The method permits not only to detect if the magnetic head deviates from the regular spiral magnetic track, but also to determine the direction and amount of its deviation from the regular spiral track.

When it is found by the method and apparatus according to the invention that the movement of the magnetic head deviates from the regular spiral magnetic track, adjustments can be effected either by adjusting the position of the sheet setting pin mounting plate or adjusting the magnetic head moving mechanism by known means.

Further features and advantages of the invention will be apparent from the detailed description hereinbelow set forth, together with the accompanying drawings.

DESCRIPTION OF PREFERRED EMBODIMENTS OF THE INVENTION

Figure 1:
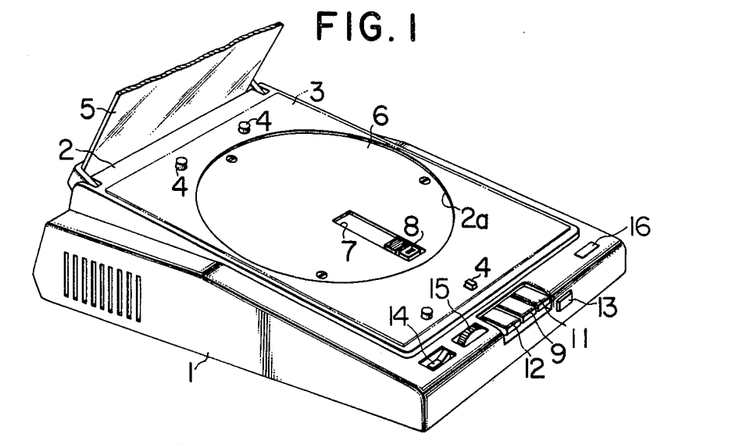
FIG. 1 is a perspective view of one example of the magnetic recording and reproducing apparatus for recording and reproducing electric signals in a spiral track.
Figure 2:
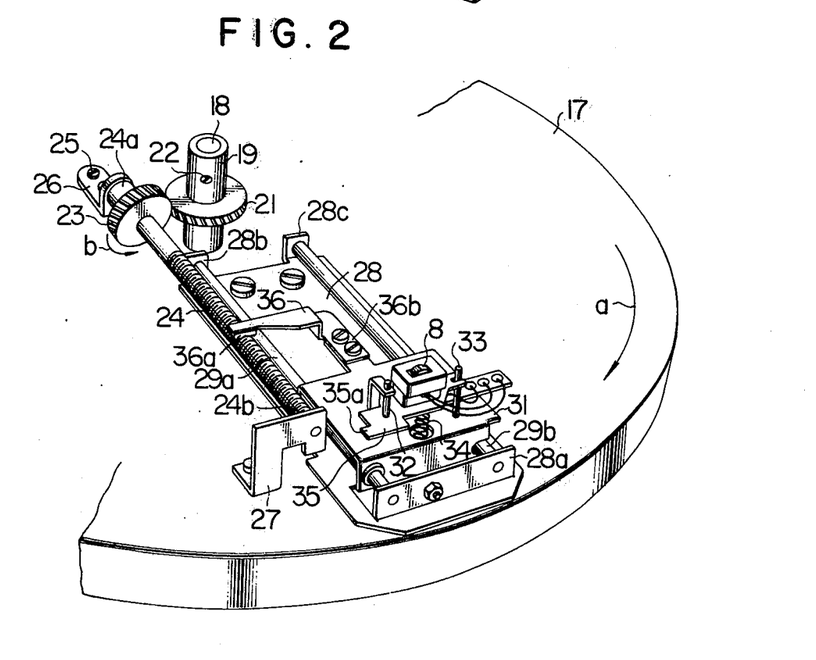
FIG. 2 is a perspective view of the mechanism for moving the magnetic head in a spiral track.
Figure 3:
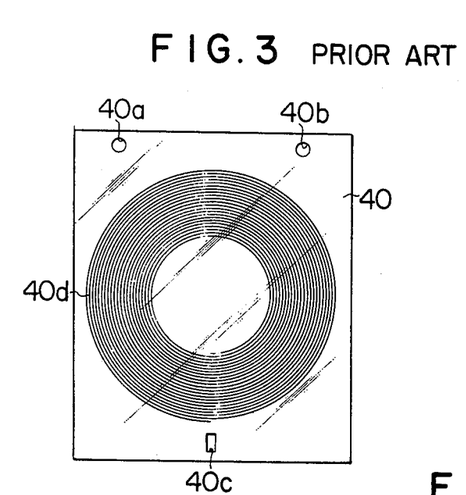
FIG. 3 is a plan view of a spiral gauge of the prior art.
Figure 4:
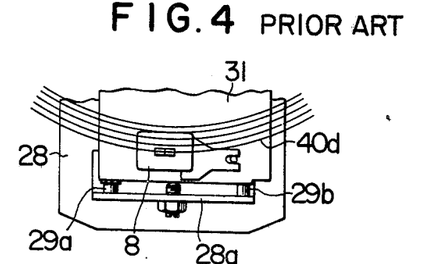
FIG. 4 is a view in explanation of the manner in which testing is carried out by using the spiral gauge shown in FIG. 3.

FIGS. 1 and 2 illustrate a type of spiral track magnetic recording and reproducing device with which the present invention may be used, while FIGS. 3 and 4 show a prior art method of detecting head deviation.

FIG. 1 shows one example of such apparatus which comprises an outer casing 1 including a top plate 2 on which a magnetic sheet 3 is adapted to be fixed. The magnetic sheet 3 is correctly positioned on the top plate 2 by three relatively short regulating pins 4.

A transparent hold-down plate 5 is hingedly connected to one end of the casing 1 for keeping the magnetic sheet 3 on the top plate when brought to a lying position. The top plate 2 is formed therein with a relatively large circular opening 2a in which is disposed a style strip 6 formed substantially integral with a turntable presently to be described. The style strip 6 is formed therein with a radial rectangular opening 7 through which extends upwardly a magnetic head 8 mounted on the turntable 17 (See FIG. 2 for details). The magnetic head is adapted to rotate with the turntable 17 as a unit and move gradually from the peripheral portion of the turntable to the center thereof by virtue of the operation of a feed screw subsequently to be described. Thus the magnetic head 8 moves in revolving motion while tracing a spiral locus, as the turntable rotates, from the peripheral portion of the turntable toward its center of rotation.

By moving such magnetic head on the magnetic surface of the magnetic sheet 3 in a spiral track, it is possible magnetically to record or reproduce electric signals. By manipulating a playback button 9, it is possible to cause the turntable to start rotating to reproduce the electric signals recorded in a spiral track or to temporarily stop its rotation. Quick feed of the turntable can be effected by manipulating a quick feed button 11 while the direction of movement of the turntable can be reversed by manipulating a reverse movement button 12. Recording of electric signals can be effected by manipulating a recording button 13 as well as the playback button 9. By manipulating these buttons, recording, playback, quick feed and reverse movement can be effected by the operation of various mechanisms (not shown). The numeral 14 is a power source switch, 15 a volume adjusting knob, and 16 a counter for counting and indicating the number of revolutions of the turntable.

The turntable 17, which is formed substantially integral with the style strip 6, is mounted as shown in FIG. 2 on a shaft 18 which is secured at its base to a main mounting plate (not shown) and has secured thereto by a screw 22 a cylindrical body 19 which is substantially integral with a helical gear 21 which is in meshing engagement with another helical gear 23. The helical gear 23 is mounted on a feed screw 24 supported at one end 24a by a supporter 26 secured by a screw 25 to the turntable 17 and at the other end 24b by a supporter 27, so that the feed screw 24 is supported parallel to the horizontal surface of the turntable 17.

The turntable 17 is adapted to be rotated in the direction of an arrow $a$ by a drive (not shown). As the turntable 17 rotates, the helical gear 23 rotates in the direction of an arrow $b$. A guide rod 29a is mounted between an upstanding portion 28a of a holder 28 secured to the turntable 17 and a bent portion 28b thereof while another guide rod 29b is mounted between the upstanding portion 28a and another bent portion 28c of the holder 28. Mounted on the guide rods 29a and 29b is a movable table 31 having two upstanding guide rods 32 and 33 planted thereon for loosely supporting an elevational plate 35 to which the magnetic head 8 is secured. Mounted between the elevational plate 35 and the movable table 31 is an expansion spring 34 which urges the elevational plate 34 to move upwardly by its biasing force. The upward movement of the elevational plate 34 is precluded by one end 35a of the elevational plate 35 abutting against an adjusting lever (not shown).

On the other hand, an L-shaped engaging arm 36 having a knife edge 36a at its free end is secured at its base to the movable table 31. The knife edge 36a is in engagement with the feed screw 24. The feed screw 24 rotates in the direction of the arrow $b$ together with the helical gear 23 as the turntable 17 rotates in the direction of the arrow $a$. As a result, rotation of the feed screw 24 moves the movable table 31 radially of the turntable through the knife edge 36a. Thus, as the turntable 17 rotates, the magnetic head 8 moves toward the center of the turntable in FIG. 2, and traces a spiral locus while moving from the peripheral portion of the turntable to the center thereof.

As the magnetic head moves in a spiral track as afore-mentioned, it scans the magnetic surface of the magnetic sheet to effect recording or playback of electric signals on the magnetic sheet.

The spiral magnetic track formed on the magnetic surface of the magnetic sheet by the magnetic head has a width of 0.8 millimeter, and the inter-track spacing is 0.45 millimeter. Thus one pitch of the spiral track is 1.25 millimeters. By tracing the spiral track of this track width, the magnetic head scans the magnetic surface of the magnetic sheet by making about 30 revolutions thereon while the turntable makes 30 revolutions. Since it takes about 8 seconds for the turntable to make one complete revolution, the magnetic sheet can record or reproduce electric signals for an interval of about 4 minutes.

In the recording and reproducing apparatus for recording electric signals in a spiral track constructed as aforementioned, the magnetic sheet 3 serving as a recording medium is fixed and the magnetic head 8 moves in a spiral track on the fixed magnetic sheet. Therefore, if the center of spiral movement of the magnetic head shows deviation, the magnetic head will be unable to follow the spirally recorded track on the magnetic sheet. More specifically, when the electric signals recorded correctly in the regular spiral magnetic track on a magnetic sheet are to be reproduced, the magnetic head will not faithfully follow the recorded magnetic spiral track but instead will deviate therefrom if the shaft 18 disposed in the center of spiral movement of the magnetic head deviates from the center of the regular spiral magnetic track formed on the magnetic sheet. It will thus become impossible faithfully to effect playback of the recorded signals.

Deviation of the movable magnetic head from the regular spiral magnetic track results not only from deviation of the shaft 18 from the center of the regular spiral magnetic track but also from disagreement between the pitch of the feed screw 24 and the pitch of the spiral magnetic track. This applies not only to the playback of recorded signals but also to the recording of signals. When recording and playback of electric signals are effected by using the same recording and reproducing apparatus, there is no trouble. However, when the electric signals recorded on a magnetic sheet by one apparatus are reproduced by another apparatus, it will be impossible to effect playback of the signals satisfactorily if either the apparatus used for recording or the apparatus used for playback has the aforementioned defect.

In order to eliminate the defect of the magnetic head deviating from the regular spiral magnetic track, it has hitherto been customary to effect adjustments by means of a spiral gauge 40. Such spiral gauge is made in sheet form from a transparent material and equal in size to a magnetic sheet. As shown in FIG. 3, it is formed therein with sheet setting openings 40a, 40b and 40c adapted to receive therein the regulating pins 4 (see FIG. 1) projecting upwardly from the surface of the magnetic recording and reproducing apparatus, and has a reference track 40d formed thereon in conformity with the regular spiral track.

In testing the magnetic head to find out if it is able to move along the regular magnetic spiral track without deviating therefrom, the spiral gauge 40 is placed on the upper surface of a magnetic recording and reproducing apparatus and the turntable 17 is rotated. The test consists in watching the movement of the magnetic head to see if the inner side of the magnetic head moves along the reference track 40d (FIG. 4).

This test is troublesome because the operator is easily fatigued by constantly watching the movement of the magnetic head. Moreover, the results may vary from person to person, making it impossible to obtain satisfactory results at all times. The job of watching the movement of the magnetic head to see if it correctly moves along the reference track 40 is tiresome. The test should be repeated about four times with one apparatus. Thus this test has the disadvantages of being time consuming and yet being unable to achieve satisfactory results.

The method and device of the invention, in various specific embodiments, will now be described with reference to FIGS. 5 – 17.

The testing sheet for electrically detecting the deviation of the movable magnetic head from the regular spiral magnetic track used in the invention is made of the same material as the above-described magnetic sheet and has the same size. It has a magnetic surface constructed in the same way as in the regular magnetic sheet. It is formed with sheet setting openings for receiving therein the same regulating pins 4 that are found in the magnetic sheet as shown in FIG. 1.

Figure 5:
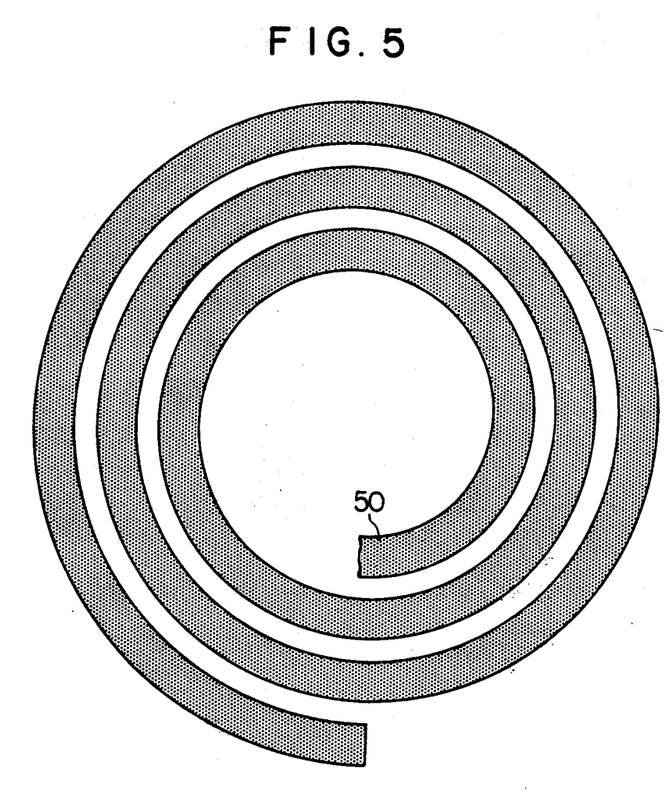
FIG. 5 is a plan view showing one example of the locus of a recording of the testing signal used in the invention.
Figure 6:
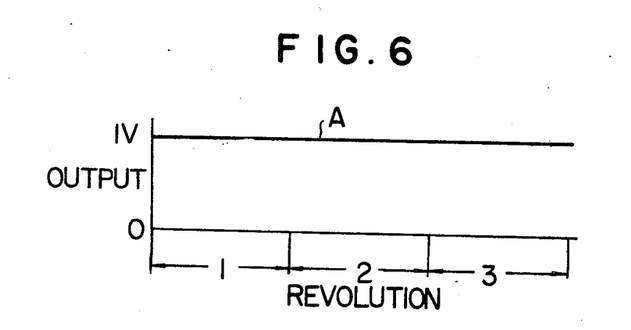
FIG. 6 is a diagram showing the output power of the magnetic head tested by tracing the test locus shown in FIG. 5 when the movement of the magnetic head shows no deviation from the regular spiral magnetic track.

One embodiment of such testing will now be described. A testing signal for detecting the deviation of the magnetic head from the regular spiral magnetic track is magnetically recorded for the extent of at least one convolution of the spiral track formed by the magnetic head on the magnetic surface 8 of such testing sheet by using a magnetic head which can accurately move by tracing the regular spiral track. The testing signal has a frequency of 1,000 Hz, for example, and is recorded in normal track width. FIG. 5 shows on an enlarged scale, such signal recorded in a locus extending for the extent of three convolutions of the spiral track as designated 50.

In testing the magnetic head to find out if it can trace the regular spiral magnetic track by using such testing sheet, the testing sheet has only to be mounted just like an ordinary magnetic sheet on a recording and reproducing apparatus to be tested. Then the turntable is rotated to cause the magnetic head to move spirally on the testing sheet. If the head moves spirally as designed, the magnetic head will trace the testing signal track 50. Thus the magnetic head will produce an outlet power 1v which is constant as indicated at A in FIG. 6 while it makes three revolutions on the testing sheet.

Figure 7:
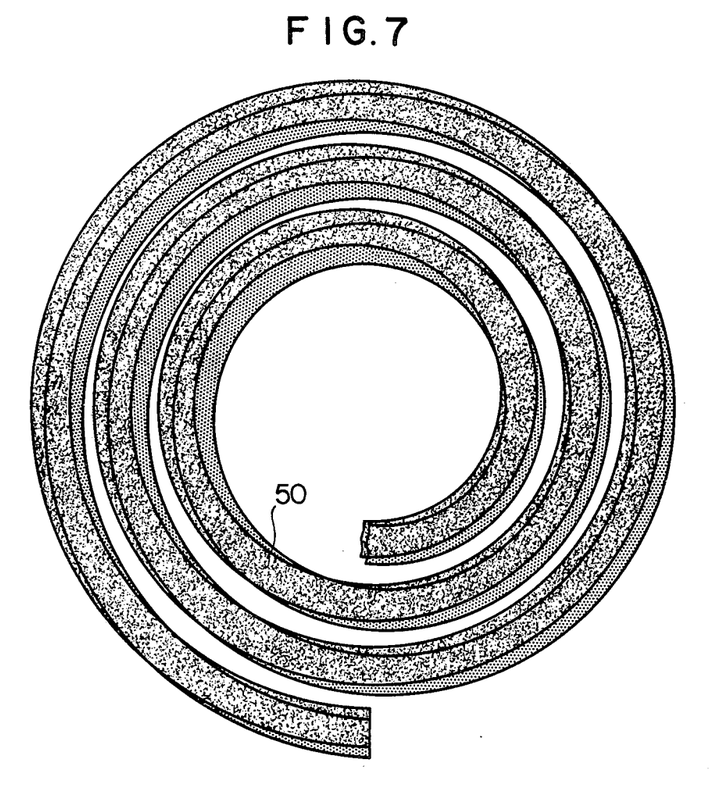
FIG. 7 is a plan view showing the locus of the movement of the magnetic head tested by tracing the test locus shown in FIG. 5 when the movement of the magnetic head shows a deviation from the regular spiral magnetic track.
Figure 8:
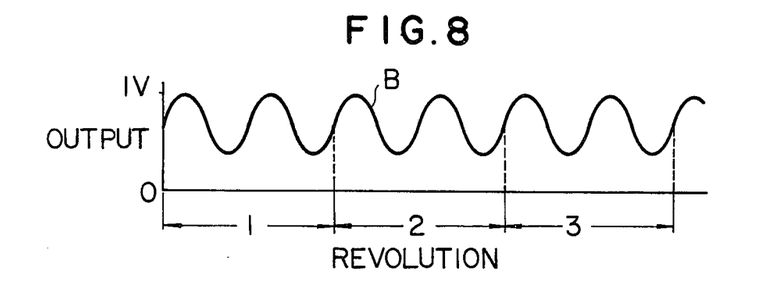
FIG. 8 is a diagram showing the output power of the magnetic head which showed the performance illustrated in FIG. 7.

However, if the magnetic head tested is unable to trace the regular spiral magnetic track, it will be unable to follow the testing signal track 50 but instead will deviate therefrom at some portions, thereby causing variations to occur in the output power. For example, if the center shaft 18 (see FIG. 2) of the turntable for moving the magnetic head in revolving motion along the spiral track is slightly displaced obliquely rightwardly downwardly with respect to the testing sheet, the magnetic head tested will not trace the testing signal track but deviate therefrom in its obliquely rightward downward portion and obliquely leftward upward portion as shown in FIG. 7. Thus the output power of such magnetic head will show periodic variations as shown in a curve B in FIG. 8. The variations manifest themselves in changes in sound, so that it is possible to find them out through the auditory sense.

Figure 9:
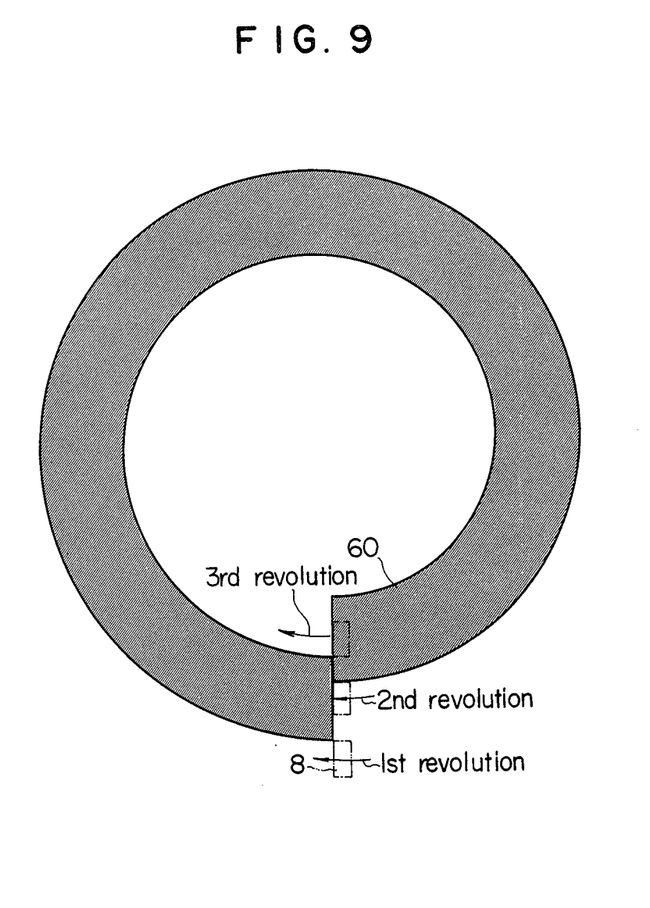
FIG. 9 is a plan view showing another example of the locus of a recording of the testing signal used in the invention.
Figure 10:
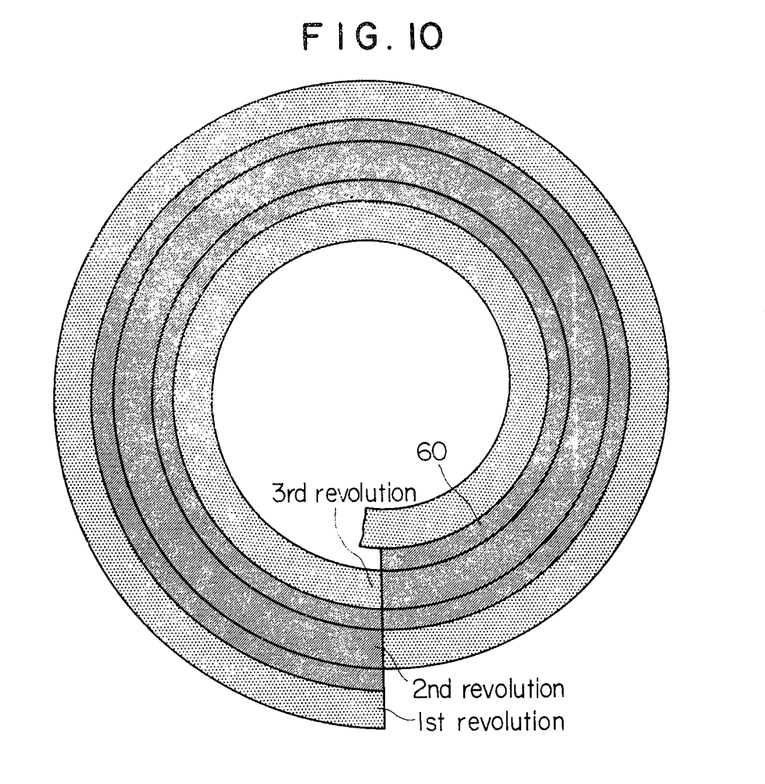
FIG. 10 is a plan view showing the locus of movement of the magnetic head tested by tracing the test locus shown in FIG. 9 when the movement of the magnetic head shows no deviation from the regular spiral magnetic track.
Figure 11:
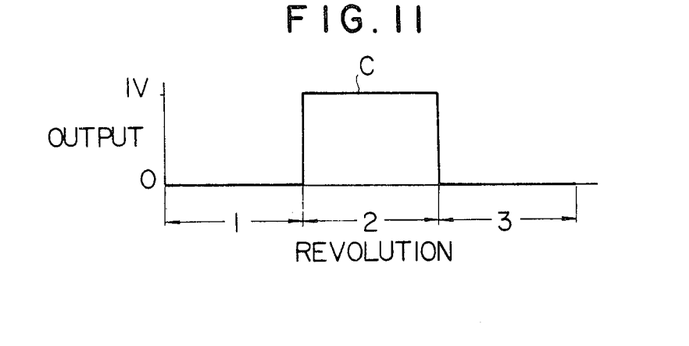
FIG. 11 is a diagram showing the output power of the magnetic head which showed the performance illustrated in FIG. 10.

A second embodiment of the testing method according to the invention will be described. A signal track 60 having a track width shown in FIG. 9 is formed on the magnetic surface of the testing sheet used in this embodiment. As aforementioned, the regular spiral magnetic track formed by the magnetic head has a width of 0.8 millimeter and an intertrack spacing of 0.45 millimeter. The signal track formed on the testing sheet used in the second embodiment has a width of 1.7 millimeters (0.8 + (0.45 × 2)) which includes the width of the regular spiral magnetic track and the width of the recordingless zones on opposite sides of the track. FIG. 9 shows on an enlarged scale a testing signal having a frequency of 1,000 Hz recorded in the aforementioned testing signal track for the extent of one convolution of the regular spiral magnetic track. When the magnetic head tested is able to trace the regular spiral magnetic track, it moves along the outer side of the testing signal 60 in its first revolution as shown in FIG. 10, and its output is zero. When it moves its second revolution, it moves along the central portion of the testing signal track 60, so that it produces an output power of say 1v as shown in FIG. 11 which remains constant while the head makes its second revolution.

In its third revolution, the magnetic head moves along the inner side of the testing signal track 60, so that the output power is reduced to zero. Thus the output power of the magnetic head is as indicated by the curve shown in FIG. 11. Accordingly, the test shows that the magnetic head is able to trace the regular spiral magnetic track without deviating therefrom if its output power C is produced only when the magnetic head moves in its second revolution.

Figure 12:
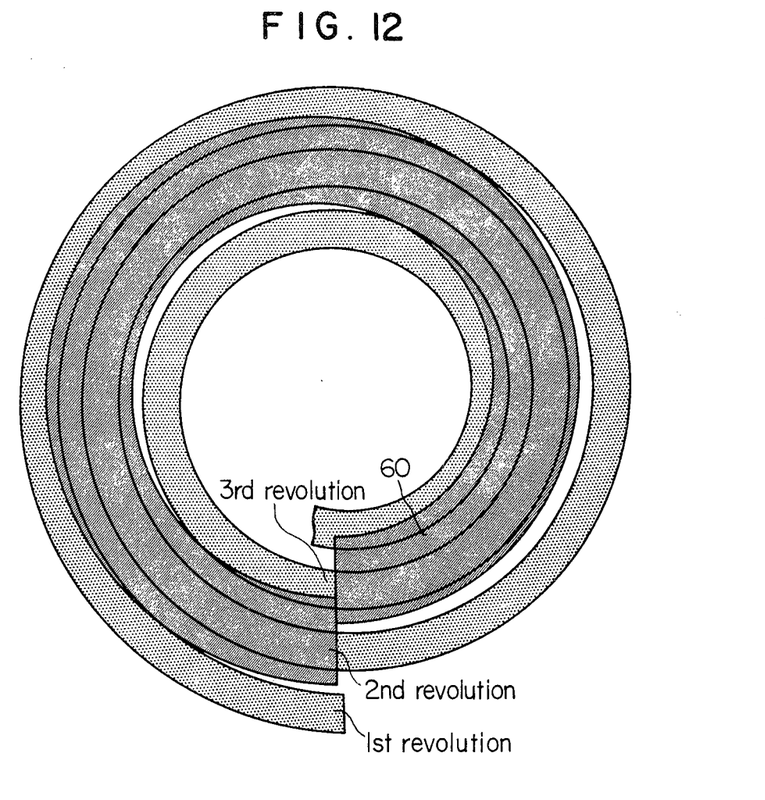
FIG. 12 is a plan view showing the locus of movement of the magnetic head tested by tracing the test locus shown in FIG. 9 when the movement of the magnetic head shows a deviation from the regular spiral magnetic track.
Figure 13:
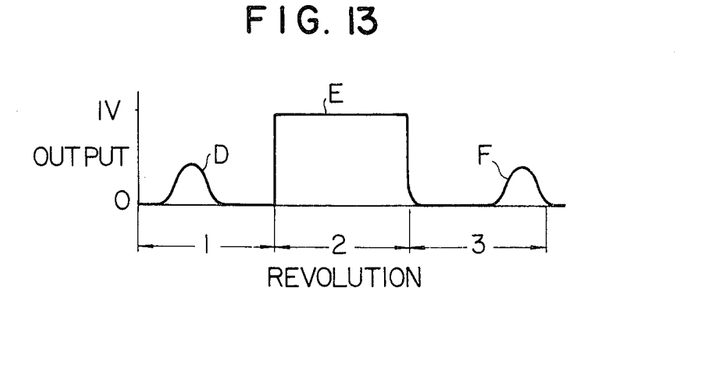
FIG. 13 is a diagram showing the output power of the magnetic head which showed the performance illustrated in FIG. 12.

If the magnetic head tested is unable to trace the regular spiral magnetic track and deviates from the testing signal track 60, or the center shaft 18 is slightly displaced obliquely rightwardly downwardly with respect to the testing sheet, the magnetic head will move into the central portion of the testing signal track 60 during its first and third revolutions as shown in FIG. 12. Thus, the output power of such magnetic head will be as shown in FIG. 13 in which a portion D of the output power is produced during the first revolution, a portion E of the output power is produced in the second revolution and a portion F of the output power is produced during the third revolution. Thus the magnetic head is found to be unable to trace the regular spiral magnetic track when it produces an output power in all of its three revolutions. The variations in output power can be recognized by hearing changes produced in sound level.

Figure 14:
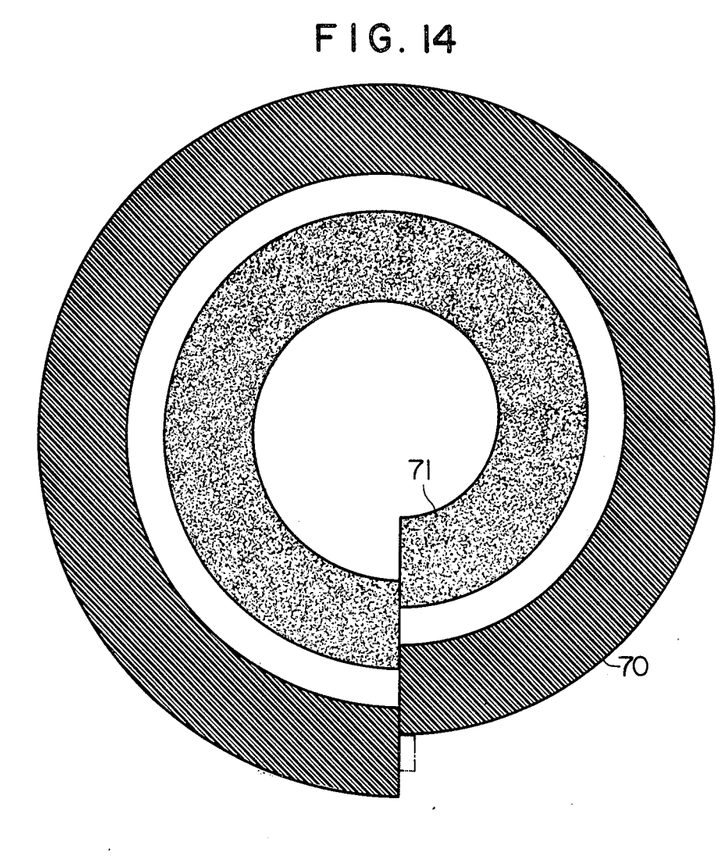
FIG. 14 is a plan view showing still another example of the locus of a recording of the testing signal used in the invention.

A third embodiment of the testing method according to the invention consists in using a testing sheet formed on its magnetic surface with testing signal tracks 70 and 71 of the pattern and track width shown in FIG. 14. The testing signal tracks 70 and 71, each of which has a width (1.7 millimeters) equal to that of the testing signal track 60 of the second embodiment, are recorded for the extent of the first and third convolutions of the regular spiral magnetic track. That is, the width of the testing signal track 70 includes the width of the first convolution of the regular spiral magnetic track and the width of the recordingless zones on opposite sides thereof, and the width of the testing signal track 71 includes the width of the third convolution of the regular spiral magnetic track and the width of the recordingless zones on opposite sides thereof. The testing signal recorded in track 70 has a frequency of 1,000 Hz and the testing signal recorded in track 71 of 2,000 Hz, for example.

Figure 15:
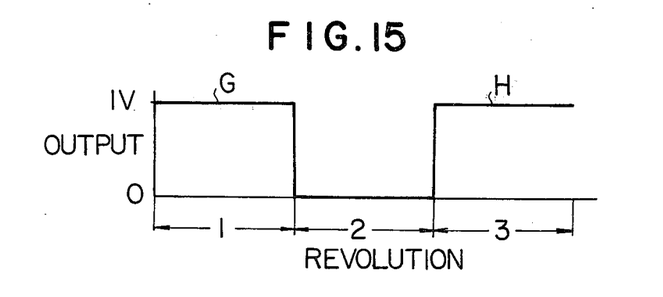
FIG. 15 is a diagram showing the output power of the magnetic head tested by tracing the test locus shown in FIG. 14 when the movement of the magnetic head shows no deviation from the regular spiral magnetic track.
Figure 16:
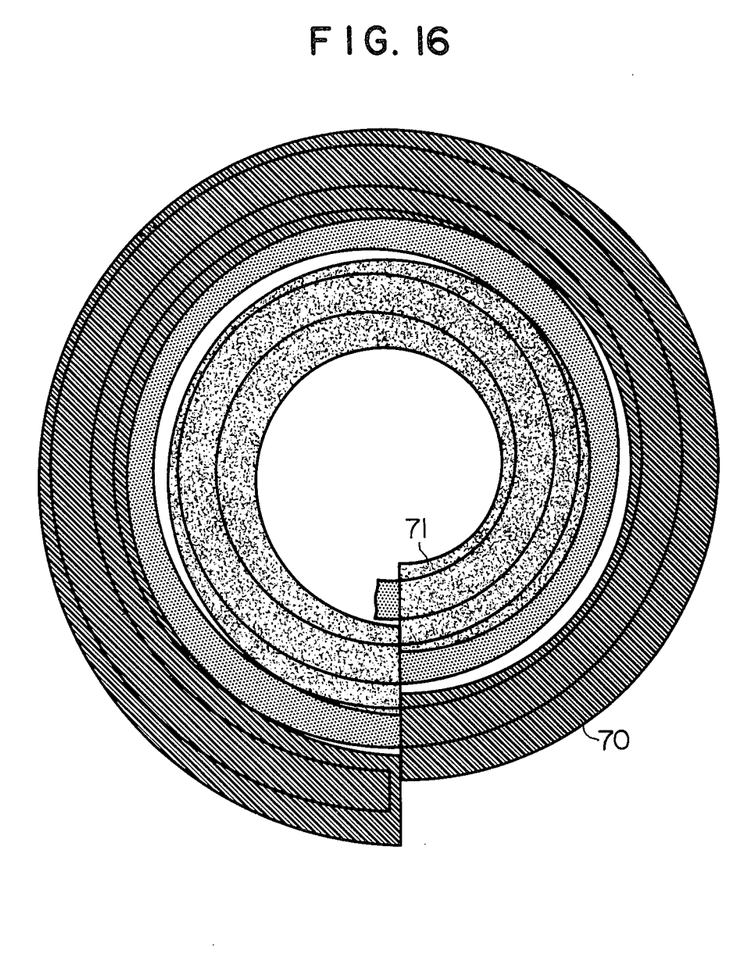
FIG. 16 is a plan view showing the locus of movement of the magnetic head tested by tracing the test locus shown in FIG. 14 when the movement of the magnetic head shows a deviation from the regular spiral magnetic track.

In operation, if the magnetic head tested is able to trace the regular spiral magnetic track without deviating therefrom, it will produce an output power G of the frequency 1,000 Hz when it traces the testing signal track 70 in its first revolution, its output will be reduced to zero when it traces an intermediate portion between tracks 70 and 71 in its second revolution, and it will produce an output power H of the frequency 2,000 Hz when it traces the testing track 71 in its third revolution as shown in FIG. 15. Thus the magnetic head is found to be able to trace the regular spiral magnetic track without deviating therefrom when it produces sound of 1,000 Hz in its first revolution, no sound in its second revolution, and sound of 2,000 Hz in its third revolution as shown in FIG. 15.

If the magnetic head tested is unable to trace the regular spiral magnetic track and deviates therefrom or the center shaft 18 is slightly displaced obliquely leftwardly downwardly with respect to the testing sheet, it will move on track 70 in its first revolution; it will move on track 70, across recordingless zone and on track 71 in its second revolution; and it will move on track 71 in its third revolution. Thus it produces sounds of 1,000 Hz and 2,000 Hz in the first and second revolutions with a short soundless interval therebetween, and produces a sound of 2,000 Hz in the third revolution. Thus it will be seen that the center shaft 18 is displaced obliquely leftwardly downwardly with respect to the testing sheet when the magnetic head tested produces sound which varies in frequency from 1,000 Hz to 2,000 Hz while the soundless interval is short.

If the center shaft 18 is displaced obliquely rightwardly upwardly with respect to the testing sheet, the sound produced by the magnetic head tested will have frequencies of 1,000 Hz and 2,000 Hz because it traces tracks 70 and 71 in second revolution. The third embodiment permits detection of the direction of deviation of the magnetic head tested from the regular spiral magnetic track by judging variations in the sound produced.

From the foregoing, it will be appreciated that the invention permits to find out if a magnetic head is able to trace the regular spiral magnetic track without deviating therefrom by listening to the sound it produces by tracing any one of the testing signal tracks. Since it takes the turntable about eight seconds to make one complete revolution, the magnetic head can make one revolution in about eight seconds. By analyzing variations in the sound produced by the magnetic head in the interval of eight seconds and converting the result into an angle, it is possible to determine the direction in which the magnetic head deviates from the regular spiral magnetic track.

Although the various embodiments of the invention described above are effective to determine if the magnetic head tested is able to follow the regular spiral magnetic track, it is impossible to determine, merely by listening to the sound, the amount of deviation of the magnetic head. In order to determine the amount of deviation, it is necessary to record the output power of the magnetic head on a sheet of recording paper by means of an electromagnetic oscillograph or other recorder.

Figure 17:
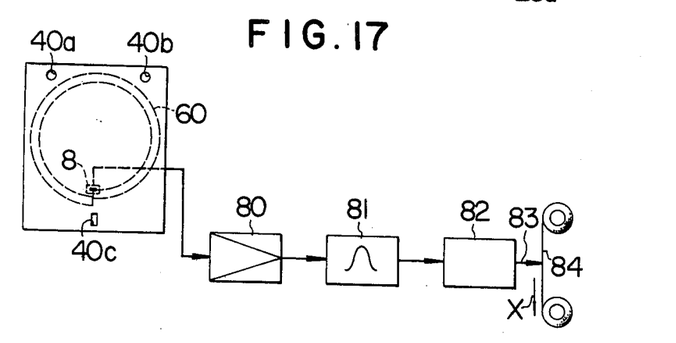
FIG. 17 is a schematic view showing one example of the magnetic head testing means.

One embodiment of the magnetic head testing means whereby the output power of the magnetic head tested can be automatically recorded on a sheet of recording paper will be described with reference to FIG. 17. A testing sheet formed on its magnetic surface with the testing signal track 60 of the aforementioned second embodiment is used for this means. If the testing signal track 60 on which a reference signal of 1,000 Hz is recorded is traced by the magnetic head 3 to be tested, the output power of the magnetic head will be amplified by an amplifier 80 and passed through a band-pass filter 81 which permits only the signal of 1,000 Hz to pass therethrough before being introduced into a level meter 82. The output power is recorded on a sheet of recording paper 84 moving in the direction of an arrow x by a pen 83 which is adapted to be actuated by the output of lever meter 82. By recording the output power level of the magnetic head tested in this way, it is possible readily to determine the direction and amount of deviation of the movement of the magnetic head from the regular spiral magnetic track from the recorded output power level.

While the testing sheet has been described as being constructed to test magnetic heads for ability to trace the regular spiral magnetic track while the head makes three revolutions on the testing sheet, it is to be understood that the invention is not limited to this number of revolutions and that the magnetic head may make any number of revolutions on the testing sheet without departing from the scope and spirit of the invention.

What is claimed is:

1. A method of testing movable magnetic heads for ability to trace a predetermined spiral magnetic track without deviating therefrom for magnetic recording and reproducing apparatus wherein electric signals are recorded and reproduced in a spiral track, comprising the steps of a. magnetically recording a magnetic head deviation detection signal in a spiral signal track on a testing sheet for disposition of the signal on a first convolution of the predetermined spiral magnetic track and both sides of said first convolution, such that said spiral signal track has a width equal to the width of the predetermined spiral magnetic track plus the width of the two recordingless zones on both sides of said first convolution, and has an edge coincident with an edge of a convolution of said predetermined spiral magnetic track adjacent said first convolution;

b. juxtaposing said sheet to a turntable carrying a magnetic head to be tested;

c. operating the turntable and head for tracing of the detection signal by the head and production of output power representative of the signal as detected by the head, the operating step including moving the head in a radial direction with respect to the axis of turntable rotation during tracing of the detection signal by the head; and d. detecting the produced output power level to determine deviation of the head from the predetermined spiral track as represented by departure of said output power level from a predetermined relation to said signal.

2. A device for testing movable magnetic heads for ability to trace a predetermined spiral magnetic track without deviating therefrom for magnetic recording and reproducing apparatus wherein electric signals are recorded and reproduced in spiral track, comprising a testing sheet having magnetically recorded thereon a magnetic head deviation detection signal formed in a spiral signal track on a first convolution of the predetermined spiral magnetic track and both sides of said first convolution, said spiral signal track having a width equal to the width of the predetermined spiral magnetic track plus the width of the two recordingless zones on both sides of said first convolution, and having an edge coincident with an edge of a convolution of the predetermined spiral magnetic track adjacent said first convolution, and means for detecting an output power level of a movable magnetic head to be tested when said magnetic head is caused to trace the deviation detection signal by being carried on a rotating turntable while being moved in a radial direction with respect to the axis of turntable rotation.

3. A device according to claim 2, wherein said testing sheet has said magnetic head deviation detection signal recorded on a first convolution and a third convolution of the predetermined spiral magnetic track, a portion of said deviation detection signal recorded on the first convolution differing in frequency from a portion of said deviation detection signal recorded on the third convolution.

4. A device according to claim 2, wherein said means for detecting an output power of a movable magnetic head to be tested is a recorder adapted to automatically record the output of said magnetic head on a recording sheet.

5. In combination with a magnetic head, means carrying said magnetic head for advance thereof along a spiral path, and means for holding a magnetic sheet in a position for tracing of a spiral magnetic recording track thereon by said head, a device for detecting deviation of the head from a predetermined spiral magnetic track during advance of the head, said device comprising a. a testing sheet having recorded thereon a magnetically detectable deviation signal in a spiral signal track positioned on a first convolution of the predetermined spiral magnetic track and both sides of said first convolution, such that said spiral signal track has a width equal to the width of the predetermined spiral magnetic track plus the width of the two recordingless zones on both sides of said first convolution, and has an edge coincident with an edge of a convolution of said predetermined spiral magnetic track adjacent said first convolution, for mounting in said holding means to be traced by said head; and b. means for detecting the output power level of said head when the head traces said deviation signal on said testing sheet as the head is carried on a rotating turntable while being moved in a radial direction with respect to the axis of turntable rotation.

* * * * *